(12) United States Patent
Alavi

(10) Patent No.: US 11,709,726 B2
(45) Date of Patent: Jul. 25, 2023

(54) ERROR DYNAMICS ANALYSIS

(71) Applicant: BUSINESS OBJECTS SOFTWARE LTD., Dublin (IE)

(72) Inventor: Arta Alavi, Andresy (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 88 days.

(21) Appl. No.: 17/333,480

(22) Filed: May 28, 2021

(65) Prior Publication Data
US 2022/0382613 A1 Dec. 1, 2022

(51) Int. Cl.
*G06F 11/00* (2006.01)
*G06F 11/07* (2006.01)
*G06N 5/025* (2023.01)

(52) U.S. Cl.
CPC ........ *G06F 11/079* (2013.01); *G06F 11/0772* (2013.01); *G06F 11/0775* (2013.01); *G06N 5/025* (2013.01)

(58) Field of Classification Search
CPC . G06F 11/079; G06F 11/0772; G06F 11/0775
See application file for complete search history.

(56) References Cited

U.S. PATENT DOCUMENTS

2012/0036397 A1* 2/2012 Balani .................. G06F 11/079
714/45

* cited by examiner

*Primary Examiner* — Philip Guyton
(74) *Attorney, Agent, or Firm* — Mintz Levin Cohn Ferris Glovsky and Popeo, P.C.

(57) ABSTRACT

A method, a system, and a computer program product for analyzing error messages. A first error log generated as a result of an execution of at least one task of a computing system at a first instance is received. The first error log include a plurality of first error messages. A first association rules model is generated using the first error messages. The first association rules model includes a plurality of association rules defining one or more relationships. A second error log, including a plurality of second error messages, generated as a result of an execution of the task at a second instance is received and a second association rules model is generated using the second error messages. Based on the first and second association rules models, at least one error message pattern associated with execution of the at least one task is determined.

18 Claims, 12 Drawing Sheets

ERROR DYNAMICS ANALYSIS

TECHNICAL FIELD

This disclosure relates generally to data processing and, in particular, to analysis of dynamics of errors in error logs generated by various software applications.

BACKGROUND

In today's world, many companies rely on software applications to conduct their business. Software applications deal with various aspects of companies' businesses, which can include finances, product development, human resources, customer service, management, and many other aspects. Software applications typically operate from servers and can be stored in memory.

Managing a quality of cloud system and/or application can be a challenge. Computing services that may be part of such cloud system and/or application may generate large amounts of data (e.g., gigabytes, etc.) in a form of logs and/or any other information that may be hard to analyze. However, it is important to perform analysis of such logs (e.g., error logs, execution logs, etc.) to determine an overall health of the system, analyze errors, etc. However, current analytics tools for such analysis are not capable of determining dynamics of errors, which may be important for reducing a number of false alarms that may be generated, and/or for identifying portions of code that may require a code review.

SUMMARY

In some implementations, the current subject matter relates to a computer implemented for analyzing error messages in a computing system. The method may include receiving a first error log generated as a result of an execution of at least one task of a computing system at a first instance. The first error log may include a plurality of first error messages. The computing system may include a plurality of computing components configured to execute the task. The method may further include generating, using the plurality of first error messages in the first error log, a first association rules model. The first association rules model may include a plurality of association rules. Each association rule may define one or more relationships between at least one of: one or more first error messages in the plurality of error messages, one or more computing components in the plurality of computing components, the computing system, the task, and any combination thereof. The method may also include receiving a second error log generated as a result of an execution of the task of the computing system at a second instance. The second error log may include a plurality of second error messages. A second association rules model may be generate using the plurality of second error messages in the second error log. Based on the first and second association rules models, at least one error message pattern associated with execution of the task may be determined.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
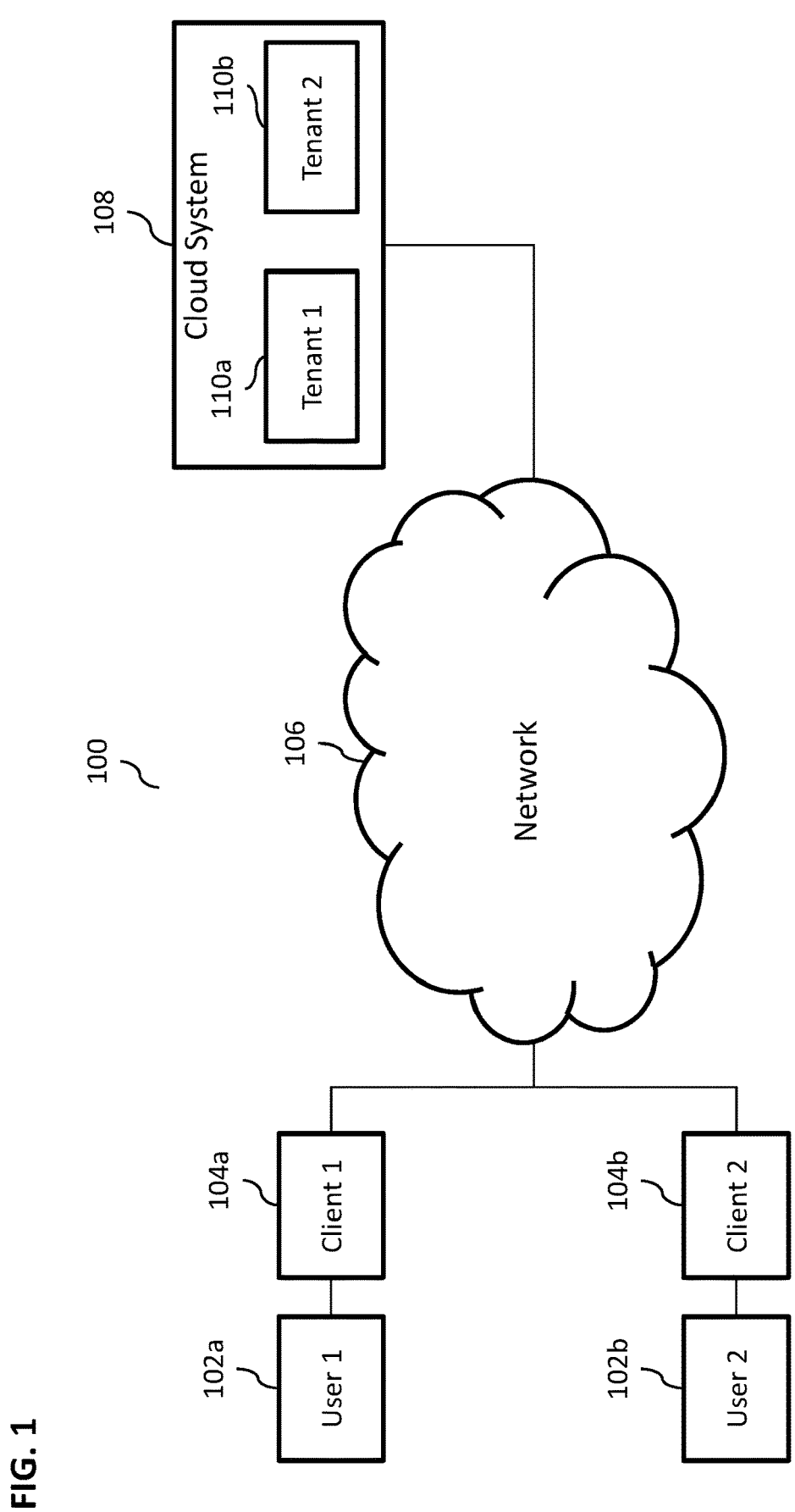
FIG. 1 illustrates an exemplary cloud computing system that may be configured to perform analysis of dynamics of errors generated by various computing processes, according to some implementations of the current subject matter.

To address the deficiencies of currently available solutions, one or more implementations of the current subject matter provide for an ability to analyze error messages in error logs generated by various software applications using one or more association rules so as to improve resolution of various software applications' errors and/or conflicts.

In some implementations, the current subject matter may be configured to identify one or more patterns data that may be produced as a result of various transactions, user sessions, etc. The patterns may be formed into one or more association rules that may be used to analyze data included in various logs (e.g., error logs). To identify patterns, the association rules may be configured to use one or more identifiers, such as, for example, a correlation identifier, a request identifier, and/or a tenant identifier, that may be extracted from the produced data. A correlation identifier may correspond to a single user interaction with a computing system, software application, etc. and may be used transmit context between various components of a computing system that the user may be interacting with (e.g., between server services). A request identifier may be used to identify information that may be exchanged between frontend computing components and backend computing components of the computing system that the user is interacting with. A tenant identifier may be used to identify a particular tenant of the computing system.

Further, in some implementations, the current subject matter may be configured to apply one or more association rules to one or more templatized messages (e.g., messages that may be extracted from a log file and converted into a templatized format using one or more templates, as discussed below). Further, using templatized messages extracted and converted from the log file, the current subject matter may also be configured to define a message class, as discussed below. Using the templatized messages, the current subject matter may be configured to apply one or more of the following association rules for analysis of errors in a particular user session: (e1)=>e2, which means that each time e1 occurs in a user session, e2 will likely occur as well, where "e1", "e2" may be errors occurring in the user session; (e1, e2)=>e3, which means that each time e1 and e2 occur together in a user session, e3 will likely occur as well.

In some implementations, the association rules may be used to construct a graph of the error log templatized messages that may be loaded into a graph database. The association rules may be built/generated based on various aspects of the computing system (e.g., time granularity that may be required of the analysis of errors). By way of a non-limiting example, if a monthly analysis of errors is desired, association rules analysis using the data for each month may be processed. Thus, by way of non-limiting example, association rules may be loaded into a graph database along with a monthly tag. This way, the behavior changes across time (e.g., new links or entities, missing links or entities, etc.) may be compared. By way of another non-limiting example, association rules models may be generated for each release of a software application product, allowing tracking behavioral changes that may be implied by a new release of that product. This may be helpful for analysis of global patterns in the software application products.

The graph may be configured to have a particular graph schema and an interface may be generated for accessing and/or querying error log templatized messages stored in the graph database. For example, the current subject matter may include a graph data engine that may be configured to execute a query of the graph data stored in the database to obtain the desired results responsive to the request. The graph data engine may be further configured to generate a specific query on a graph data stored in the database that may be used to read data stored in the database. The generated interface may then be used to present results responsive to the user request. The results may be arranged in any desired format, which may be used for execution of one or more queries (e.g., queries in Cypher Query Language format).

As stated above, in some implementations, the current subject matter may be configured to generate templatized message based on the messages contained in logs (e.g., error logs). In particular, the current subject matter may be configured to execute monitoring of various log(s) (e.g., error logs) that may be generated by a computing system (e.g., cloud computing system, application, etc.) during operation, execution of its components, etc. and perform tracking of error(s), number(s) of errors, specific pattern(s) of error(s), etc. and use that information for analysis and as part of an alerting mechanism. As part of the monitoring, the current subject matter may be further configured to extract and/or remove various contextual information from the log message(s) and generate non-contextual and/or comparable error messages that may be indicative of the issues and/or errors that may be affecting the computing system and may need to be resolved to ensure its operation. Moreover, the current subject matter may be configured to implement various template(s) to generate such non-contextual and/or comparable error messages (e.g., "templatized messages"). In some exemplary implementations, one or more templates used for generation of the templatized messages may be selected from a plurality of existing templates, which may have been previously generated (e.g., as a result of a previous analysis), have been pre-loaded into the computing system, and/or generated on-the-fly (e.g., in real-time).

FIG. 1 illustrates an exemplary cloud computing system 100 that may be configured to implement log monitoring and/or templatization process as well as determination of error dynamics of errors generated by the system, implementations of the current subject matter. The cloud computing system 100 may include a cloud system and/or cloud application 108. The cloud system 108 may be configured to provide a variety of services including, for example, software-as-a-service (SaaS), platform-as-a-service (PaaS), and/or the like. These services may be accessible to one or more tenants of the cloud system 108 including, for example, a first tenant 110a and a second tenant 110b. For example, as a platform-as-a-service tenant, the first tenant 110a and/or the second tenant 110b may use the cloud system 108 for the development and/or deployment of services and/or applications. Alternately and/or additionally, as a software-as-a-service tenant, the first tenant 110a and/or the second tenant 110b may utilize the applications and/or services running on the cloud system 108.

The cloud system 108 may host a plurality of cloud services and/or cloud applications. For example, the cloud services may include application services, machine learning, Internet-of-Things services, big data services, security services, and/or any other services and/or applications. In some exemplary implementations, the cloud system 108 may include a runtime container, which may supports execution of the application services, machine learning, Internet-of-Things services, big data services, security services, etc. The cloud applications may include a plurality of applications including, for example, a human resources application, a business-to-business procurement application, an e-commerce application, a vendor management system (VMS) application, an expense reporting application, and/or any other applications. The system 108, cloud services, and/or cloud applications may be configured to generate one or more error logs during operation and/or execution. The error logs may be indicative of various problems, errors, exceptions, etc. that may have been encountered, generated, etc. by the system 108, cloud services, and/or cloud applications. The templatization and/or analysis of these errors may be configured to be performed by the system 108 and/or any computing component outside of the system 108.

As shown in FIG. 1, users associated with the first tenant 110a and/or the second tenant 110b may access the services (e.g., software-as-a-service, platform-as-a-service, etc.) provided by the cloud system 108 via a network 106. The network 106 may be any wired and/or wireless network such as, for example, a public land mobile network (PLMN), a wide area network (WAN), a local area network (LAN), the Internet, and/or the like. A first user 102a may communicate with the cloud system 108 via any wired and/or wireless device such as, for example, a first client 104a. A second user 102b may also communicate with the cloud system 108 via any wired and/or wireless device such as, for example, a second client 104b. The first client 104a and/or the second client 104b may be communicatively coupled with the cloud system 108 via the network 106. Further, it should be appreciated that the first user 102a and/or the second user 102b may communicate with the cloud system 108 via different devices than shown.

The first user 102a and the second user 102b may access the system, applications, services, etc. provided by the cloud system 108 by being associated with one or more tenants of the cloud system 108 including, for example, the first tenant 110a and/or the second tenant 110b. To illustrate, the first user 102a may be associated with the first tenant 110a and may access data and/or resources associated with the first tenant 110a. The second user 102b may be associated with the second tenant 110b and may access data and/or resources associated with the second tenant 110b. However, it should be appreciated that the first user 102a and the second user 102b may both be associated with either the first tenant 110a or the second tenant 110b.

Figure 2:
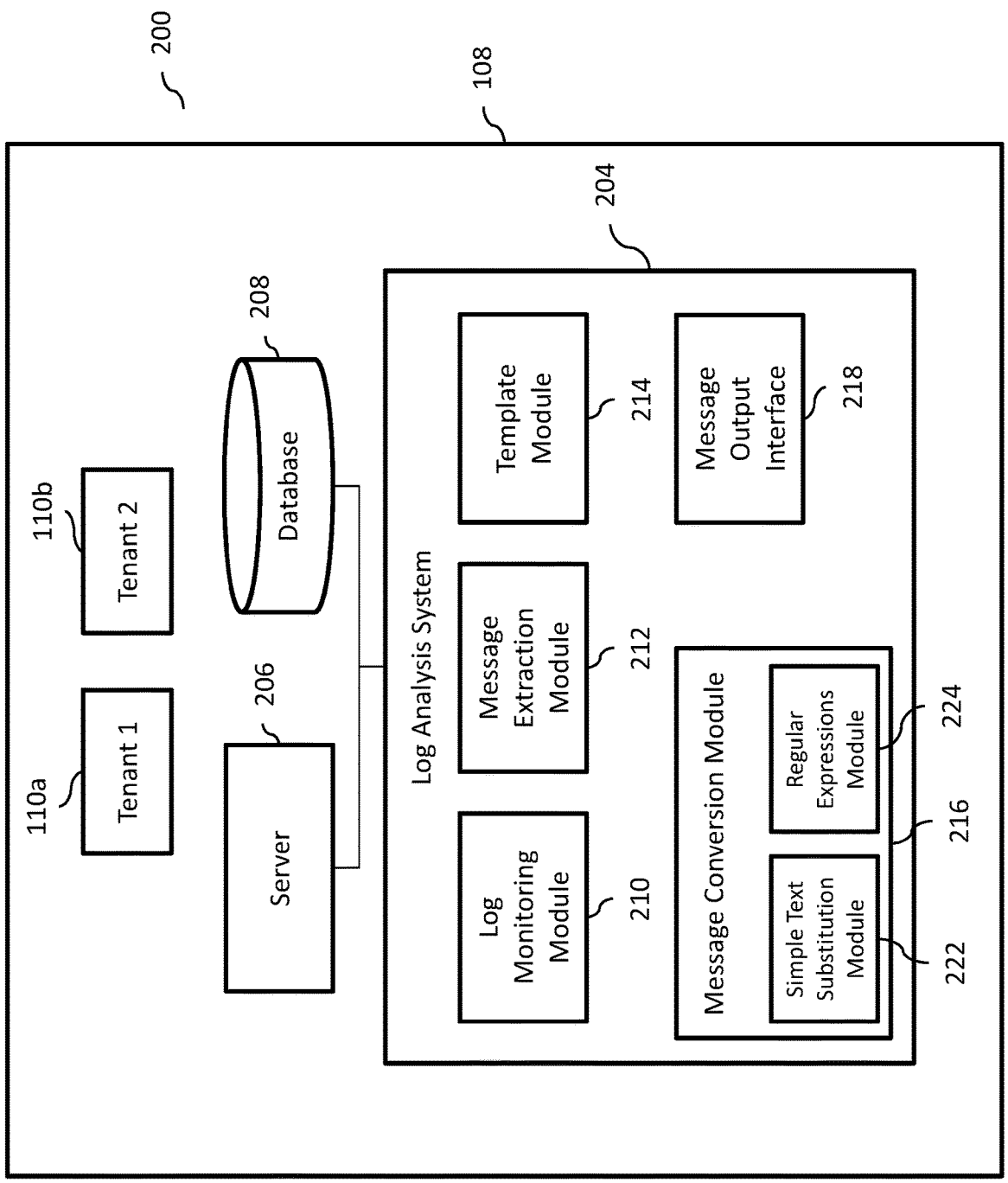
FIG. 2 illustrates an exemplary system for executing an error message analysis and templatization, according to some implementations of the current subject matter.

FIG. 2 illustrates an exemplary system 200 for executing an error message analysis and templatization, according to some implementations of the current subject matter. One or more components of the system 200 may be incorporated into the cloud system 108, shown in FIG. 1. In particular, the cloud system 108, in addition to the tenants 110, may be configured to also include a log analysis system 204, a server 206, and a database 208. As stated above, a user (e.g., user 102a, 102b, shown in FIG. 1) may access the cloud system 108 for performing various tasks. The user may be an individual user, a software application, a process, and/or any other user and/or any combination thereof. Performance and/or execution of tasks by the system 108 and/or any of its components may be configured to generate various logs, e.g., execution logs, error logs, etc.

The generated logs may be processed by the server 206 and/or stored in the database 208. The log analysis system 204 may be configured to access the processed logs for the purposes of performing analysis and/or templatization, which may include removal of various contextual information through, for example, simple text substitution and/or use of regular expression algorithms. Such removal of contextual information and/or templatization may be configured to greatly reduce the number of different messages that may be included in the logs. For example, an error log containing an error directed to execution of a function of a software application may include different contextual information (e.g., different processed input data, etc.), but the error causing generation of the error message may be the same regardless of the context. Additionally, the error may be generating different error messages at different times, thereby including different contextual information in the error messages. This may create a multitude of error messages that are all related to the same error in the software application, thereby making analysis of the error expensive and time-consuming. By templatizing the error messages, the current subject matter system may be configured to reduce the number of error messages that may be related to the same error.

Referring back to FIG. 2, the log analysis system 204 may include software, hardware, and/or any combination thereof. The system 204 may be communicatively coupled to the server 206 and/or the database 208 and/or any other components of the cloud system 108. The server 206 may perform various functionalities, e.g., obtaining and/or storing data from/to the database 208. The database 208 may be configured as a graph database and may store various data, including execution data, log data, metadata, which may be used by the system 108 for performing various functions.

In some implementations, the log analysis system 204 may be configured to include a log monitoring module 210, a message extraction module 212, a template module 214, a message conversion/transformation module 216, and a message output interface 218. The components 210-218 may be configured to be communicatively coupled with one another and/or with any other component of the log analysis system 204 and/or cloud system 108.

The log monitoring module 210 may be configured to execute monitoring of error logs and/or any other logs. For ease of description and illustration only, the following discussion will refer to error logs and error messages, but as can be understood, the current subject matter may be applicable to any type of logs. The error logs may be generated by execution of various software applications and/or software application components by the cloud system 108. In some exemplary implementations, the error logs may be directly supplied to the log analysis system 204, e.g., by the server 206. The error log may include information that may have application messages, exception stack trace, thread information, and/or any other information. A substantial portion of the error log may include various contextual information that might not be necessary for the purposes of analysis of an error and/or determination what caused an error and/or how to resolve it.

In particular, an exemplary error log row may include various mandatory data and/or attributes such as, for example, 'APPlogger', 'APP.msg', etc. It may also include various optional data and/or attributes, such as, for example, 'APP.correlation_id' (may be used for tracking user interaction when errors occur; this identifier may also be linked to a user session identifier, e.g., to indicated that an application failed/was failing to comply with one or more mandatory attributes), 'APP.tenant_id' (may be used to indicate a location where an error occurred with respect to a particular tenant), 'APP.stacktrace', etc. The APP.msg attribute may include one or more error message(s) from the application logger.

A message extraction module 212 may be configured to extract error messages from the received error logs that are being monitored by the log monitoring module 210. The extracted error messages may be configured to include various information, data, etc. such as identification of a nature of the error (e.g., "SQL execution failed") as well as include various contextual specifics of the error (e.g., "SAP DBTech JDBC: [13000]: user-defined error: "310264227".

"(DO statement)": line 9 col 1 (at pos 736): [13000] (range 3) user-defined error exception: [{"severity":"ERROR«"). The latter aspects might not be relevant to what the specific error is and/or which tasks may need to be performed to correct the error.

In some implementations, the template module 214 may be configured to execute a script that may select a specific template for a particular message. For example, the template module 214 may be configured to include a plurality of message templates that may be used for conversion of a specific error message into a standardized or templatized format that may be easily readable during analysis of the error message. Alternatively or in addition, a message conversion module 216 may be configured to dynamically generate templates for error messages contained in the error log. A simple text substitution module 222 of the message conversion module 216 may be executed to convert "raw" error messages into a standardized or templatized format. In some implementations, where simple text substitution is not possible, the message conversion module 216 may be configured to include a regular expressions module 224. In some exemplary implementations, system 200 may be configured execute simple text substitution process on an error message, and if that does not change the error message into a templatized format, the system 200 may be configured to execute regular expressions process by the regular expressions module 224. Moreover, the system 200 may incorporate a filtering mechanism that may be executed to automatically forward error messages to the regular expressions module 224 for templatization, where it may be already known that a simple text substitution process cannot be executed on a particular error message for templatization purposes.

In some implementations, the current subject matter system 204, either through use of pre-defined templates, simple text substitution, regular expressions, and/or any other processes may be configured to remove contextual information from raw error messages contained in the error log. As stated above, such removal of contextual information may be configured to reduce cardinality of the dimensions of the error messages (i.e., APP.msg). Instead of the error message, a template message (e.g., template_message) may be generated by the system 204.

Figure 3:
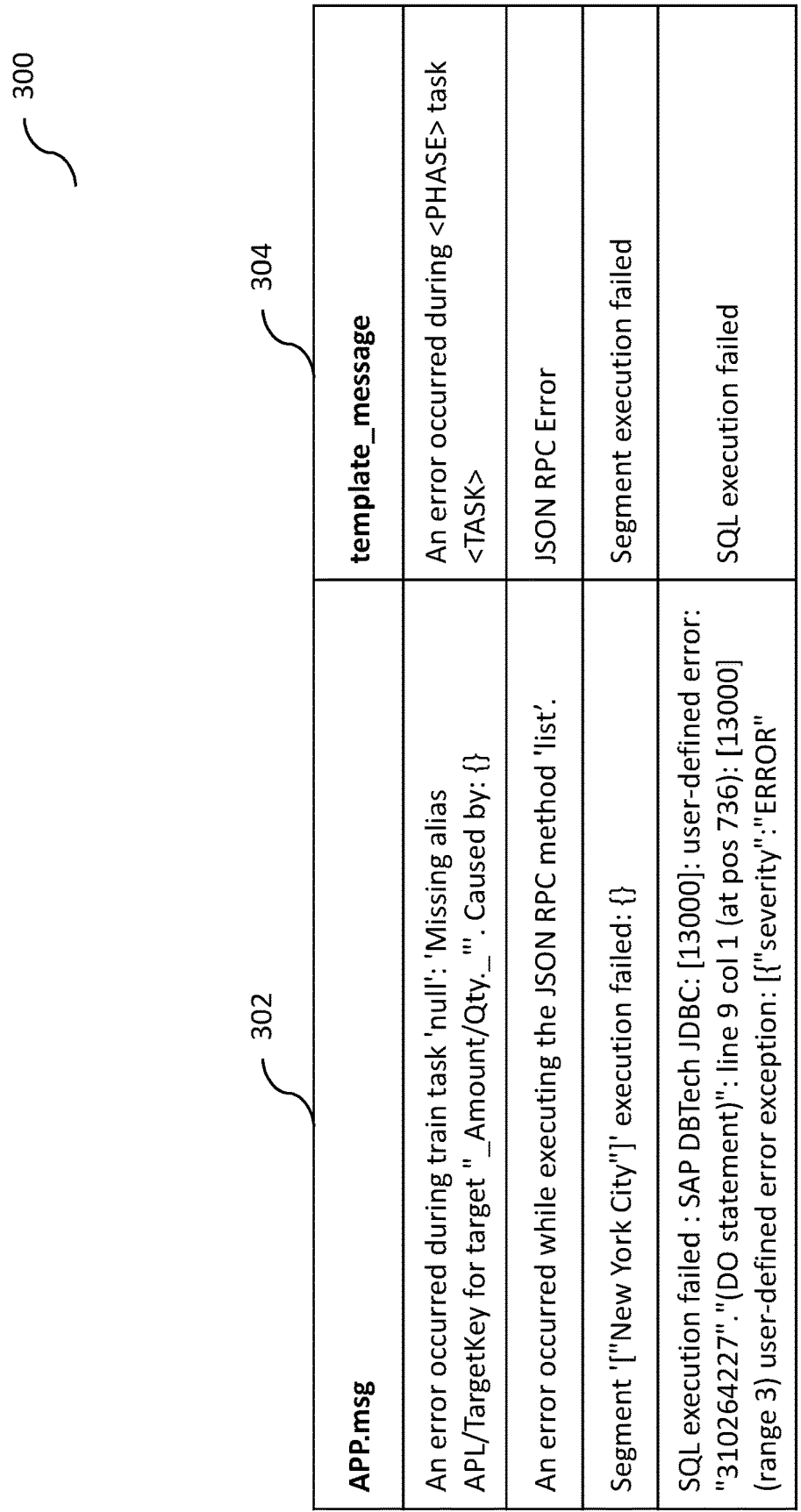
FIG. 3 illustrates an exemplary table containing error messages in a templatized format, according to some implementations of the current subject matter.

FIG. 3 illustrates an exemplary table 300 containing the above error messages in a templatized format. As shown in FIG. 3, original messages (APP.msg) are shown in column 302 and corresponding templatized messages (template_message) are shown in column 304.

For example, the error message of An error occurred during train task 'null': 'Missing alias APL/TargetKey for target "_Amount/Qty._"'. Caused by: {} may be standardized/templatized as An error occurred during <PHASE> task <TASK>. The error message An error occurred while executing the JSON RPC method 'list'. may be presented in a template format as JSON RPC Error, as shown in column 304 in FIG. 3. Similar conversions may be performed for other error messages shown in FIG. 3 (and/or for any other error messages contained in the error log). In some implementations, the message output interface 218, shown in FIG. 2, may be configured to display, transmit, etc. the table 300. Alternatively, or in addition to, the message output interface 218 may be configured to display, transmit, etc. only template_message 304, which may identify the specific error without any contextual and/or extraneous information that might not be important and/or useful for analysis and/or resolution of the error.

In some implementations, the system 200, as shown in FIG. 2, may be configured to use and/or generate one or more rules and/or sets of rules for performing the error message templatization process of error messages in an error message log. The rules may be pre-existing/pre-loaded/stored/etc. ("pre-existing rules") in the system 200. For example, the rules for converting the contextual error messages into templatized error messages may be generated by developers of a particular system, software application, module, etc. The developers of the system may generate such pre-existing rules during development. New rules may be generated as a result of occurrence of specific errors, frequency of errors, type of errors, etc. The rules may be associated with specific computing components and/or generated based on frequency of occurrence of errors, users'/systems'/etc. behaviors when responding to errors, and/or any other factors/combination of factors. The pre-existing rules and/or newly generated rules may be used during execution of simple text substation processes and/or regular expression processes, as discussed herein.

In some implementations, an error log file may include a APP.msg column that may contain an initial or un-templatized error message (e.g., with contextual content being included). At the start of the templatization process, this column may be copied into "template_message" column 304 (shown in FIG. 3). The column 304 may contain this original message until it is processed using message templatization rules into a templatized format, at which time, it may be replaced with the templatized message. Message templatization rules may be organized in accordance with a particular computing component (e.g., system module, software application, software application function, computing task, processing block, communications component, etc.). This may be helpful to avoid potential conflicts when similar errors are generated by different computing components.

As stated above, message processing rules may be defined using one or more of the following categories: simple text substitution or replacement rules and regular expression rules. In some cases, the system 200 (shown in FIG. 2) may be configured to check whether the system 200 may already include any pre-existing rules in either of these categories. If not, the system 200 may be configured to generate one or more of such rules (which may be based on the factors discussed above). Alternatively, or in addition to, the new message processing rules may be generated externally to the system 200.

In some implementations, the simple text substitution/replacement message processing rules may include one or more replacement conditions. By way of a non-limiting example, msg.startwith("Cannot find file") may be replaced with a replacement string of "File not found". Thus, the string "Cannot find file 'C:\temp\file.log'" will be replaced by "File not found", thereby extracting the local context from it. As such, the new value of the "template_message" column 304 will be "File not found".

Regular expression message processing rules are processing complex patterns such as, for example, "re.sub(r'The .* service response full content was "{\"message\":\"(.*?)',  r'\\1', s)". Using the regular expression message processing rules, the input message "The dataset service response full content was '502 Bad Gateway: Registered endpoint failed to handle the request.'" may be transformed into "502 Bad Gateway: Registered endpoint failed to handle the request." and the latter may be placed into the column 304 of the table 300 shown in FIG. 3.

Each error message in the error log may be processed using the simple text substitution/replacement rules that may be associated with and/or specific to a particular computing component. If after application of the simple text substitution/replacement rules to the error message, the error message is has not changed, the message may then be processed by the regular expression message processing rules. If after processing the message using the regular expression message processing rules, the message has not changed, the message will be stored in its original form and its value in column 304 will not change.

In some exemplary implementations, conversion of error messages into templatized/standardized error messages may be helpful in identifying an error message class (e.g., grouping of errors). Error message classes may be used while executing analytics of error messages to determine, for example, a number of errors occurring in a specific error message class, frequency of specific errors, timing of errors, etc.

As stated above, the current subject matter may be configured to apply association rules (e.g., that may be loaded into the database 208 shown in FIG. 2) to templatized messages and/or message classes, where messages/message classes may be represented using a graph schema. Such association rules may be used to determine one or more sequences of and/or models being illustrative of error messages (and thus, errors) that may be generated by a particular computing system/component, computing environment, software application, software application function, computing task, etc., and/or any combination thereof (hereinafter, "computing component"). For example, error 1 may be followed by error 101, which is in turn follower by error 201, etc. (exemplary graph schemas are illustrated in FIGS. 4 and 5*a*-5*f*). As stated above, the error messages may be templatized so that the sequences/models are based on a lower cardinality of error messages. Such sequences/models, for example, may be specific to one or more of the following: a particular point in time, a particular environment, and any combination thereof. The particular point of in time may be indicative of a particular user session, during which there is interaction with a computing component, e.g., by a user, another computing component, etc. The particular environment may be indicative of a specific computing component, and/or its version, interaction among computing components (e.g., calls, queries, etc.).

The association rules may be used to analyze dynamics of changes in the sequences/models of error messages. For example, a first sequence/model of error messages may be generated during a first instance (e.g., a first point in time, a first user session, a first version of a software application, etc.). A second sequence/model of error messages may be generated during a second instance (e.g., a second point in time, a second user session, a second or following version of the software application, etc.). The patterns of error messages in each sequence/model may be compared to determine how errors have changed. For example, some errors present in the first sequence/model may have disappeared from the second sequence/model; new errors that were not present in the first sequence/model may have appeared in the second sequence/model, etc. Based on the comparison, a determination may be made that, for example, some errors were addressed, while others remain and new errors were generated. Moreover, in some implementations, the sequences/models may be supplemented with various data from the error messages, e.g., which computing component generated a particular error, which data file generated an error, etc. The following discussion of FIGS. 4 and 5*a*-*f* illustrates various examples of analysis of the dynamics of error messages.

Figure 4:
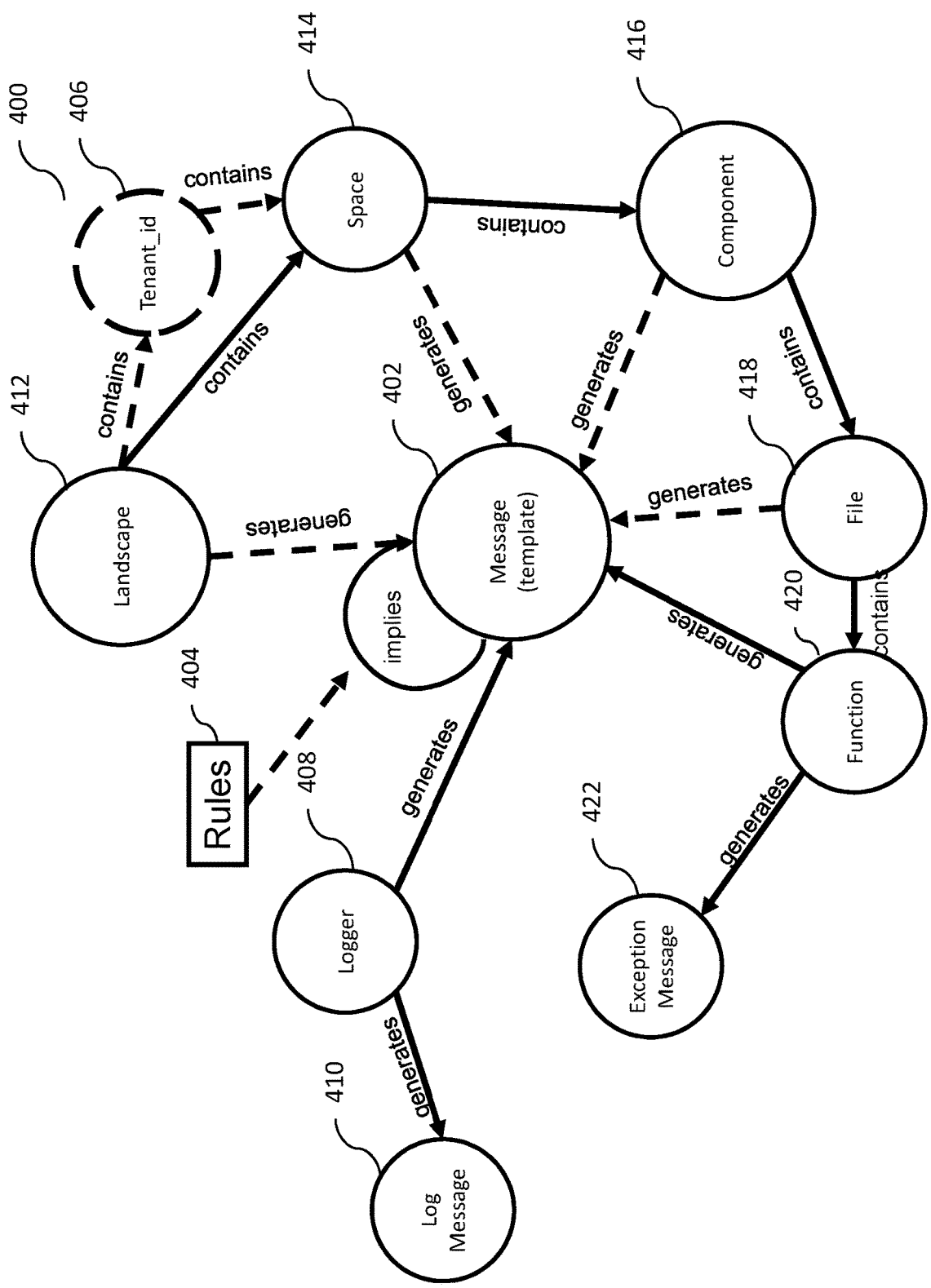
FIG. 4 illustrates an exemplary message graph schema, according to some implementations of the current subject matter.

FIG. 4 illustrates an exemplary message graph schema 400 representative of a dynamic of computing components/nodes that may be generating error messages for which association rules may be determined and/or applied for analysis of changes in dynamics of errors, according to some implementations of the current subject matter.

In some exemplary, non-limiting implementations, in order to generate association rules that may define, for instance, how error messages (and thus, errors) may be generated, whether one error message may follow another error message, action, call, execution, etc., various data may be collected from multiple and/or plurality of sessions/interactions/executions/etc. associated with a computing system, component, etc. The collected data may be used to generated a model that may be configured to define rules and/or structure of the rules. Such definitions may be based on a hyperparameter of the model. The generation of the association rules model may be configured as a training phase, which may be based on historical data. The model may be continuously updated as new data is supplied (e.g., new versions of the system, components, software, etc. are being implemented, new user sessions/interactions/executions/etc. being performed, etc.). The model may also be uploaded into a graph database and/or any other system so that the model may be used by other systems, components, users, etc. The uploaded model may also be updated as new data is received.

Further, the model's association rules may be generated using templatized error messages (as discussed herein). Because of a lower cardinality of the templatized error messages, it may be easier to generate the model/rules and/or perform any updates. However, as can be understood, any other types of error messages may be used.

As shown in FIG. 4, the error log file may be used to generate the schema 400. For example, a particular file, function, logger etc. may generate an error message. Other information may indicate that one node contains information about another node (e.g., landscape may contain tenant_Id, etc.). The association rules may be determined as a result of how the nodes behave, for example, during a particular user session, period of time, version of a system component, etc. The association rules are not contained in the error log file. The association rules and/or association rules model may allow analysis of a dynamic behavior of the computing system (that generated the error log file) over time. For example, an association rule may be used to generate a link error message M1 may implies error message M2 and may also be associated with a confidence parameter rate, which may indicate a particular level of certainty that generation of one error message (M1) may be followed by the generation of the other error message (M2), and/or vice versa. Such analysis may help in understanding of a dynamic of calls between computing components, functions, etc. of the computing system (whether at different times, user sessions, versions of system, components, etc.), that generated the error log file. It may also assist in determining steps that may be taken to reduce an amount of error messages that may be generated when an unexpected error occurs.

Referring to FIG. 4, some exemplary nodes may include a template_message 402, a tenant_id 406, a logger 408, a log message 410, a landscape 412, a space 414, a component 416, a file 418, a function 420, and an exception message 420. As can be understood, the graph schema 400 may include any other nodes. As stated above, one or more association rules 404 may be loaded into the graph database 208 and may be applied to the graph schema 400. The message graph schema 400 may also include a plurality of nodes or vertices connected by various edges that may define relationships between nodes of the graph schema. For example, the logger component 408 may be configured to "generate" the log message 410 and may also "generate" the message_template 402 using message templatization process discussed above. The templatized messages 402 may be generated by various computing components (of the system 108 shown in FIGS. 1-2). The computing components may include/contain one or more files 418, which, in turn, for example, may include/contain one or more functions 420. The latter may also generate one or more exception messages 422 whenever, for example, an error is encountered. Such messages may be included in an error log as log message 410. One or more component 416 may be part of and/or included/contained in a particular space 414, which in turn, for example, may be part of and/or included/contained a computing landscape 412. The computing landscape 412, the space 414, the component 416, the file 418, and/or the function 420 may each generate various log/error/etc. messages, which may be converted into message_template 402. One or more tenant_ids 406 may identify specific tenants (e.g., tenant 110a-b shown in FIG. 1) that may be operating/accessing/etc. in the landscape 412/space 414 and/or using components 416. The tenant_ids 406 may be used by the association rules 404 for analysis messages generated by the nodes of the schema 400 during a particular user session (e.g., component session, etc.).

In some implementations, the graph schemas (such as the one shown in FIGS. 5a-5f and discussed below) may be used to perform analysis of error messages that may be generated by a computing system (e.g., system 108 shown in FIG. 1), a specific component, a file of that component, a function of that component, a tenant and/or any other part of a computing system. The error messages may be analyzed as a result of a deployment, runtime, actions, etc. of/by a specific computing system and/or any of its components, code, functions, etc. The graph schemas may be used to analyze dynamic of the computing system, components, code, etc. and/or generated errors to determine, for example, source of problems, improve efficiency of the operation of computing system, components, code, etc. The graph schemas may be queried, navigated, and/or other analyzed. Queries, navigation, analysis, etc. may be performed based on a specific time period, error(s), computing system(s), computing component(s), function(s), code, etc.

Figure 5A:
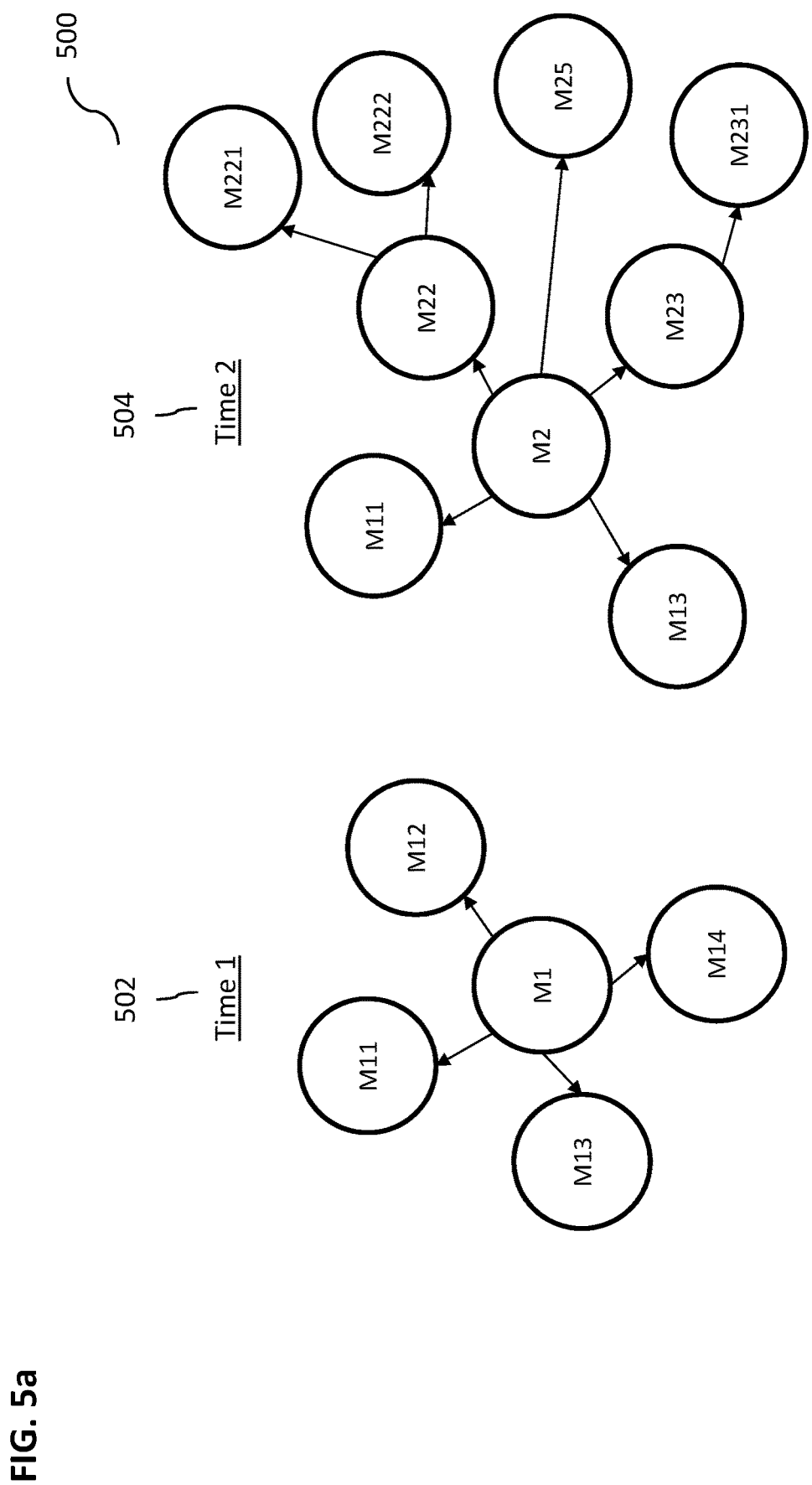
FIG. 5a illustrates an exemplary message graph schema, according to some implementations of the current subject matter.

FIG. 5a illustrates an exemplary message graph schema 500, according to some implementations of the current subject matter. The graph schema 500 illustrates changes in a type of messages and/or number of messages (and/or message nodes in the graph schema 500) at two different times Time 1 502 and Time 2 504. The messages in the schema 500 may be templatized messages, as discussed above. The messages may relate to various aspects of a computing system, components, etc. that is/are being analyzed. As shown in FIG. 5a, at time 502, for example, a message (e.g., an error message) M1 may have implied and/or produced a cluster of messages M11-M14. This may mean, for instance, that generation of message M1 may have resulted and/or may result in generation of messages M11-M14. At time 504, a new cluster of messages clustered around message M2 (which may be the same or different as error message M1) may be generated. For example, message M2 may have resulted and/or may result in generation of previous messages M11 and M13 and new messages M22, M23 and-M25. Previous messages M11 and M12 may be indicative of an error(s) that has/have not been resolved. Moreover, new message M22 may have resulted and/or may result in generation of its own sub-cluster of messages M221-M222. Similarly, new message M23 may have resulted and/or may result in generation of message M231. Each link between the messages may be indicative of a number of times a particular message may have been generated (e.g., during a predetermined period of time, during a particular session, lifetime, etc.), which may be used to determine that a particular pattern among messages is present. In some cases, the message may have been actual generated subsequent to another message, while in others, a generation of a particular message may be implied (e.g., it is likely that a second message will be generated subsequent to the generation of the first message). Generation of messages M2-M231 may be indicative of various actions associated with the computing system, e.g., a result of a deployment of a new code. The error messages generated at two separate instances 502, 504 may be helpful in analysis of dynamics of behavior of the system.

Figure 5B:
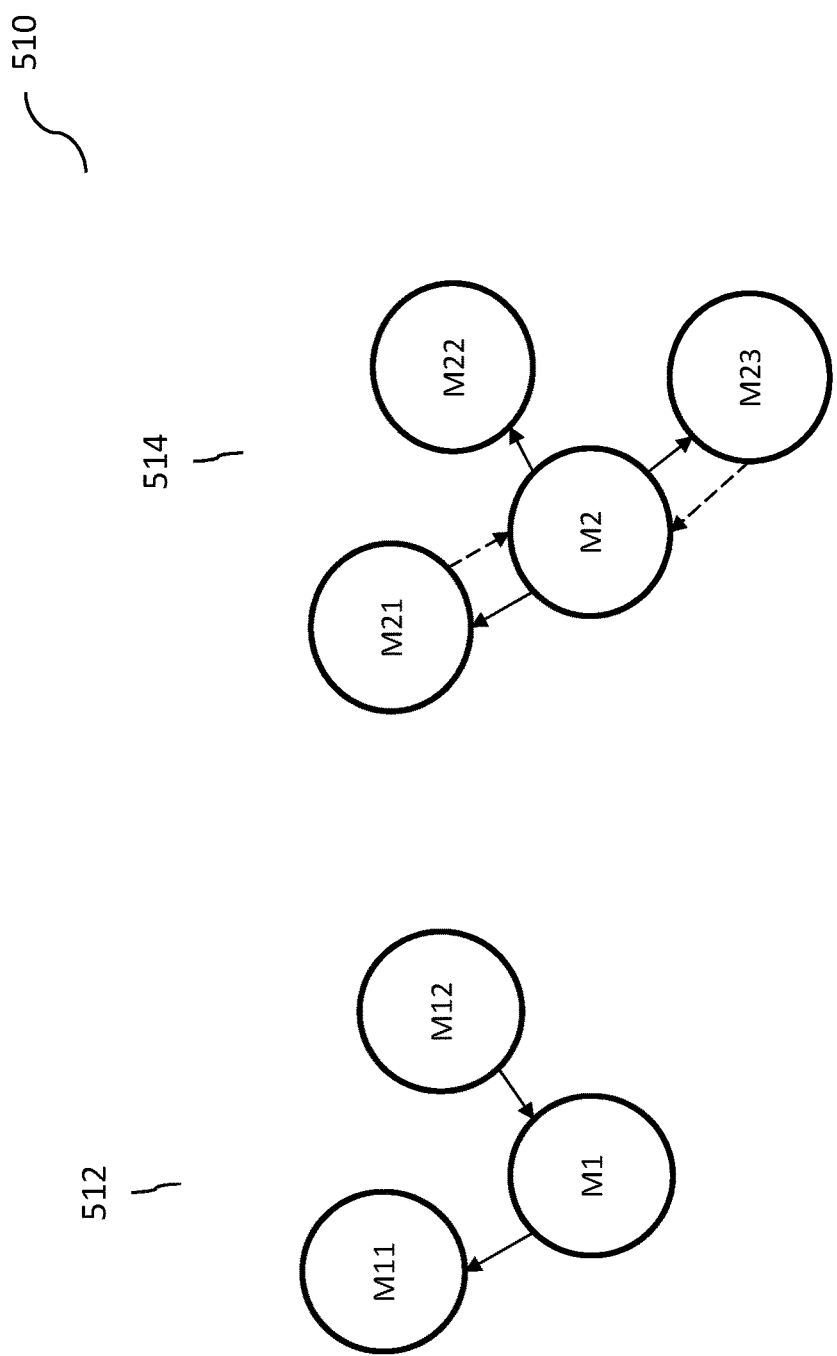
FIG. 5b illustrates an exemplary fixed pattern message graph schema, according to some implementations of the current subject matter.

FIG. 5b illustrates an exemplary fixed pattern message graph schema 510, according to some implementations of the current subject matter. In particular, FIG. 5b illustrates a first fixed pattern message schema 512, having messages M1, M11, and M12 and a second fixed pattern message schema 514 having message M2, M21, M22, and M23. The message nodes may be connected by an edge that is indicative of an actual (solid line) generation of a subsequent message (e.g., M2 to M21) or an implied (dashed line) generation of a subsequent message (e.g., M23 to M2). The fixed patterns may be indicative of a message patterns that no longer exist, such as, when specific errors generated by the computing system, components, etc. have been addressed.

Figure 5C:
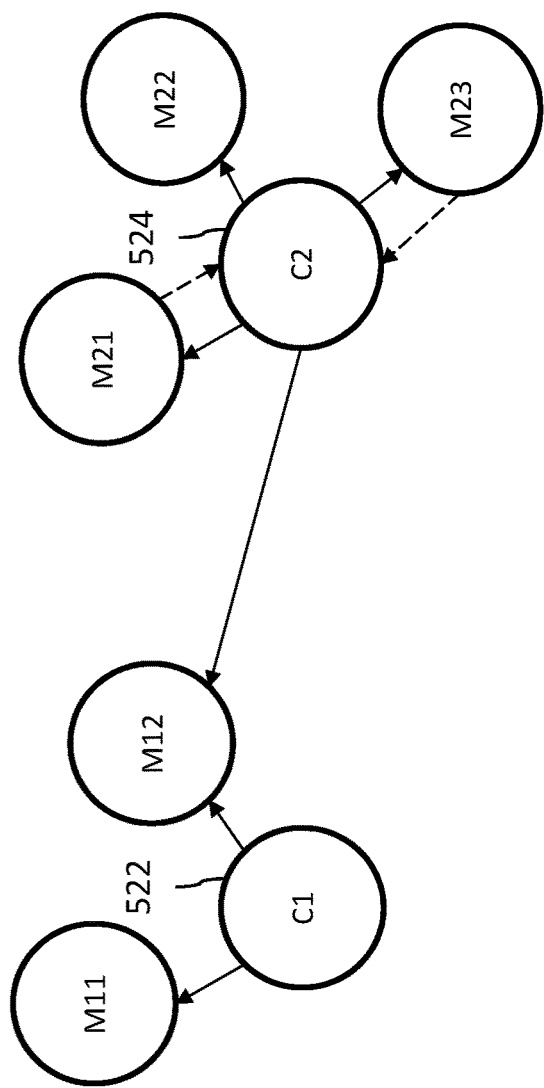
FIG. 5c illustrates an exemplary cross-component message graph schema, according to some implementations of the current subject matter.

FIG. 5c illustrates an exemplary cross-component message graph schema 520, according to some implementations of the current subject matter. The graph schema 520 may include components C1 522 and C2 524 as its nodes. As shown in FIG. 5c, for example, component C1 may be linked (e.g., generates) with messages M11, M12 and component C2 may be linked with messages M21, M22, and M23. Components C1-C2 may be components of the computing system 108 (as shown in FIG. 1). Components C1-C2 may be configured to generate any number of messages M11-M23.

In some implementations, some messages linked to one component may be configured to generate messages that may be linked to another component. Alternatively, or in addition to, components may generate messages that may also be generated by another component. As shown in FIG. 5c, component C2 may generate message M12, which may also be generated by the component C1. Such cross-component messaging may be an indicator of various calls (e.g., orchestration calls, function calls, etc.) between components.

Figure 5D:
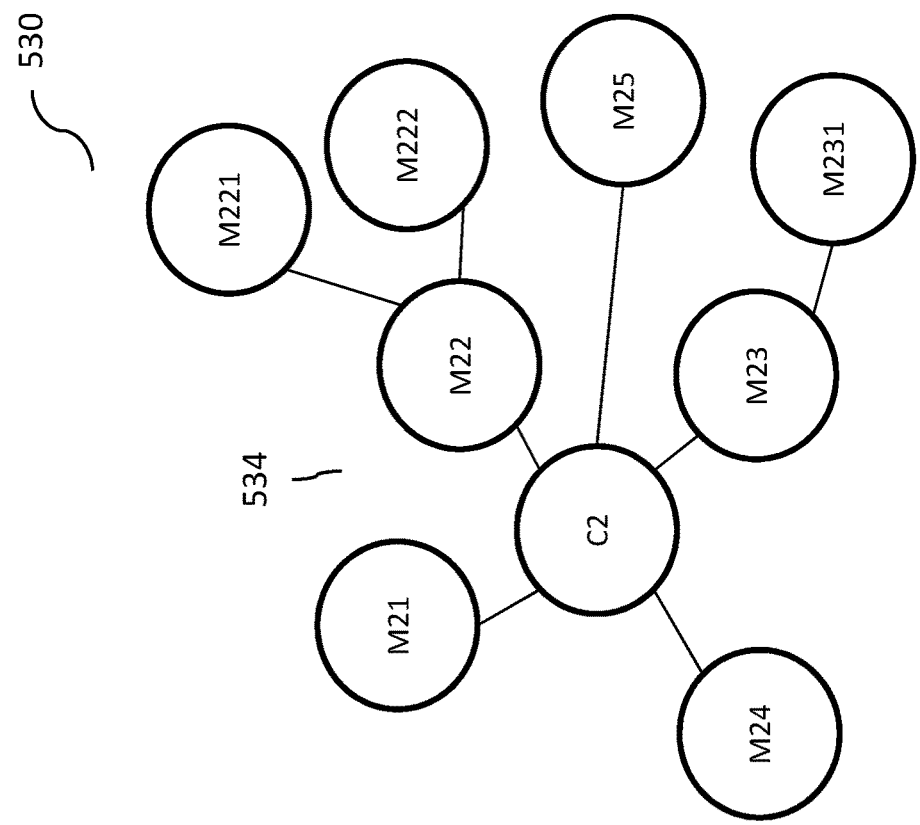
FIG. 5d illustrates an exemplary component message cluster graph schema, according to some implementations of the current subject matter.
Figure 5D:
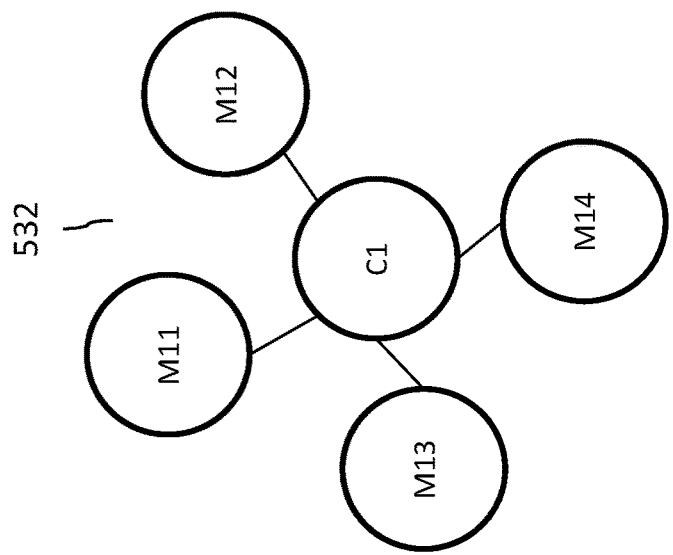

FIG. 5d illustrates an exemplary component message cluster graph schema 530, according to some implementations of the current subject matter. As shown in FIG. 5d, the graph schema 530 may be configured to include component-based message clusters 532 and 534. The cluster may be defined by a component and one or more messages that it may be generating and/or may be resulting in generation. For instance, cluster 532 may be anchored by the component C1 (e.g., of the computing system 108 shown in FIG. 1), which may be linked to messages M11-M14. Similarly, cluster 534 may be anchored by the component C2, which may be linked to messages M21-M25, M221-M222, and M231. The links between component and messages (and/or between messages) may be indicative of an actual message being generated and/or implied generation of a message. Alternatively, or in addition to, existence of a particular message may be indicative of a component that may have generated it.

Figure 5E:
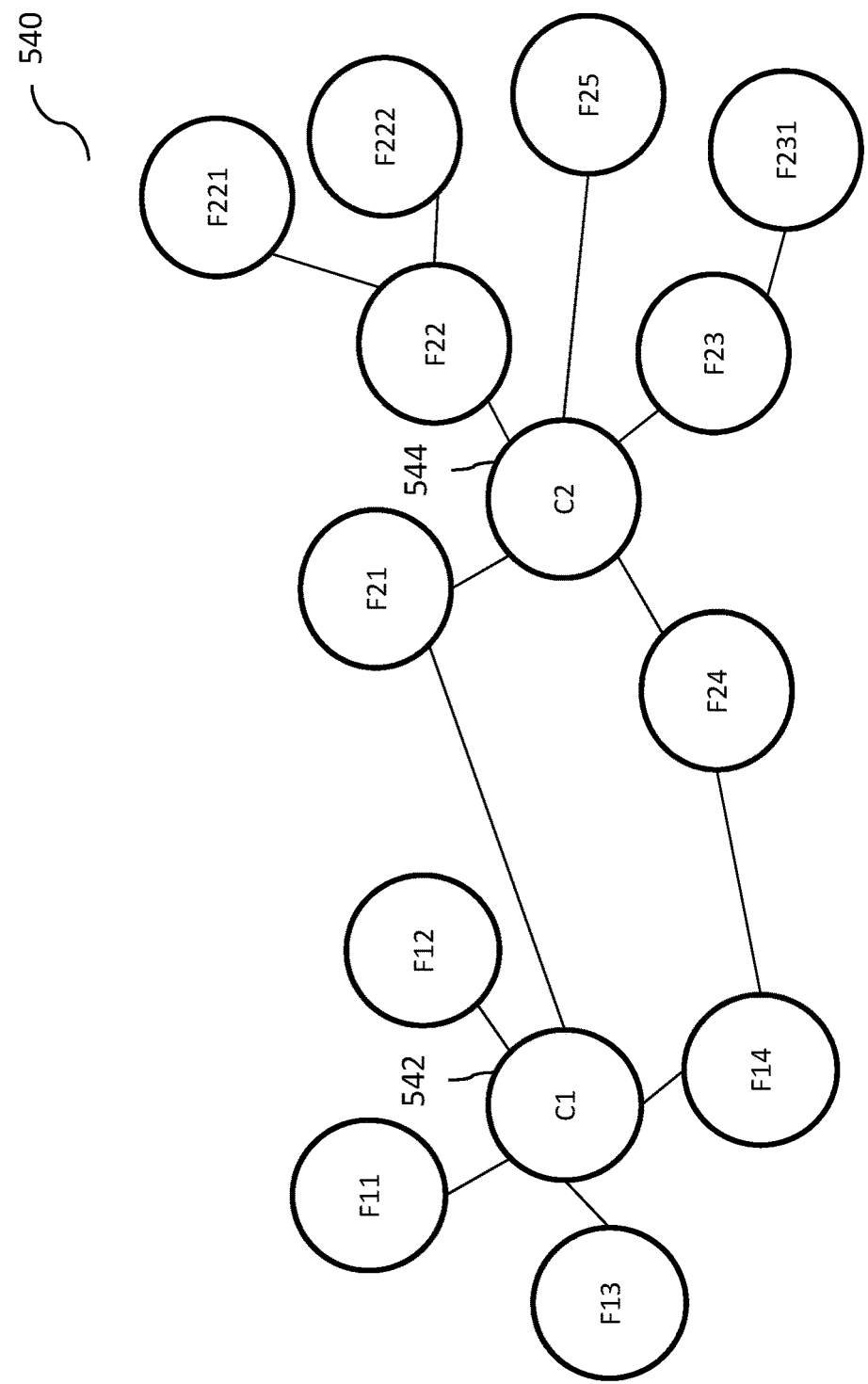
FIG. 5e illustrates an exemplary component-file graph schema, according to some implementations of the current subject matter.

FIG. 5e illustrates an exemplary component-file graph schema 540, according to some implementations of the current subject matter. The schema 540 may be helpful, by way of a non-limiting example, to analyze files used by different components in a computing system (e.g., system 108 shown in FIG. 1) such as to ensure that files are appropriate for a particular component. In some cases, it may be helpful for error root cause analysis and/or any other purposes.

As shown in FIG. 5e, the exemplary graph schema 540 may include a component C1 542 and a component C2 544. Component C1 may be linked to files F11, F12, F13, and F14. Component C2 may, in turn, be linked to files F21, F22 (which is linked to files F221 and F222), F23 (which is linked to file F231), F24, and F25. Component C1 may also be linked to component C2's file F21. This may be indicative of component C1 potentially using file F21 for its purposes (e.g., as a source file). Further, files F14 and F24 may also be linked, which may indicate that component C1 may also be using file F24. Additionally, linkage of files F14 and F24 may also be indicative that component C2 is using file F14 for its purposes (e.g., as a source file).

Figure 5F:
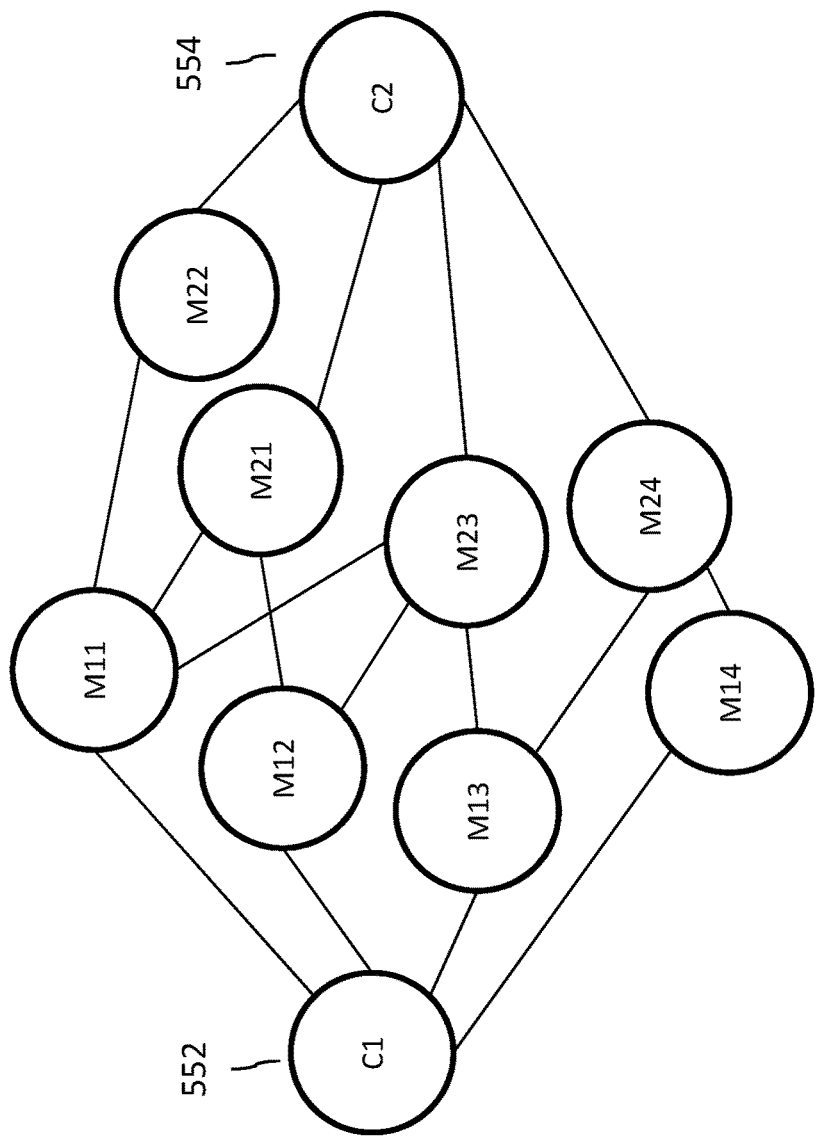
FIG. 5f illustrates an exemplary component shared messages graph schema, according to some implementations of the current subject matter.

FIG. 5f illustrates an exemplary component shared messages graph schema 550, according to some implementations of the current subject matter. The shared messages graph schema 550 may be used to determine interoperability of various components (e.g., components of system 108 shown in FIG. 1) that may be sharing various generic messages (e.g., messages that may be common to both components, where a shared message may reveal, for example, a design issue with one or more components).

As shown in FIG. 5f, schema 550 may include a component C1 552 and a component C2 554. Component C1 may be configured to be linked (e.g., generate) messages M11-M14. Similarly, component C2 may be configured to be linked (e.g., generate) messages M21-M24. Messages M11-M14 and M21-M24 may be shared between components C1 and C2. For example, message M11 may be linked with messages M21-M23; message M12 may be linked to messages M21 and M23; message M13 may be linked to messages M23 and M24; and message M14 may be linked to messages M24; and vice versa for messages M21-M24.

In some implementations, the above exemplary graph schemas may be queried and/or analyzed to determine dynamics of errors that may be occurring within a particular computing system, component, etc. This may be helpful in improving resolution of errors and more effective operation of the system. Use of templatized messages, as stated above, may also reduce cardinality of errors that may need to be queried and/or analyzed.

Figure 6:
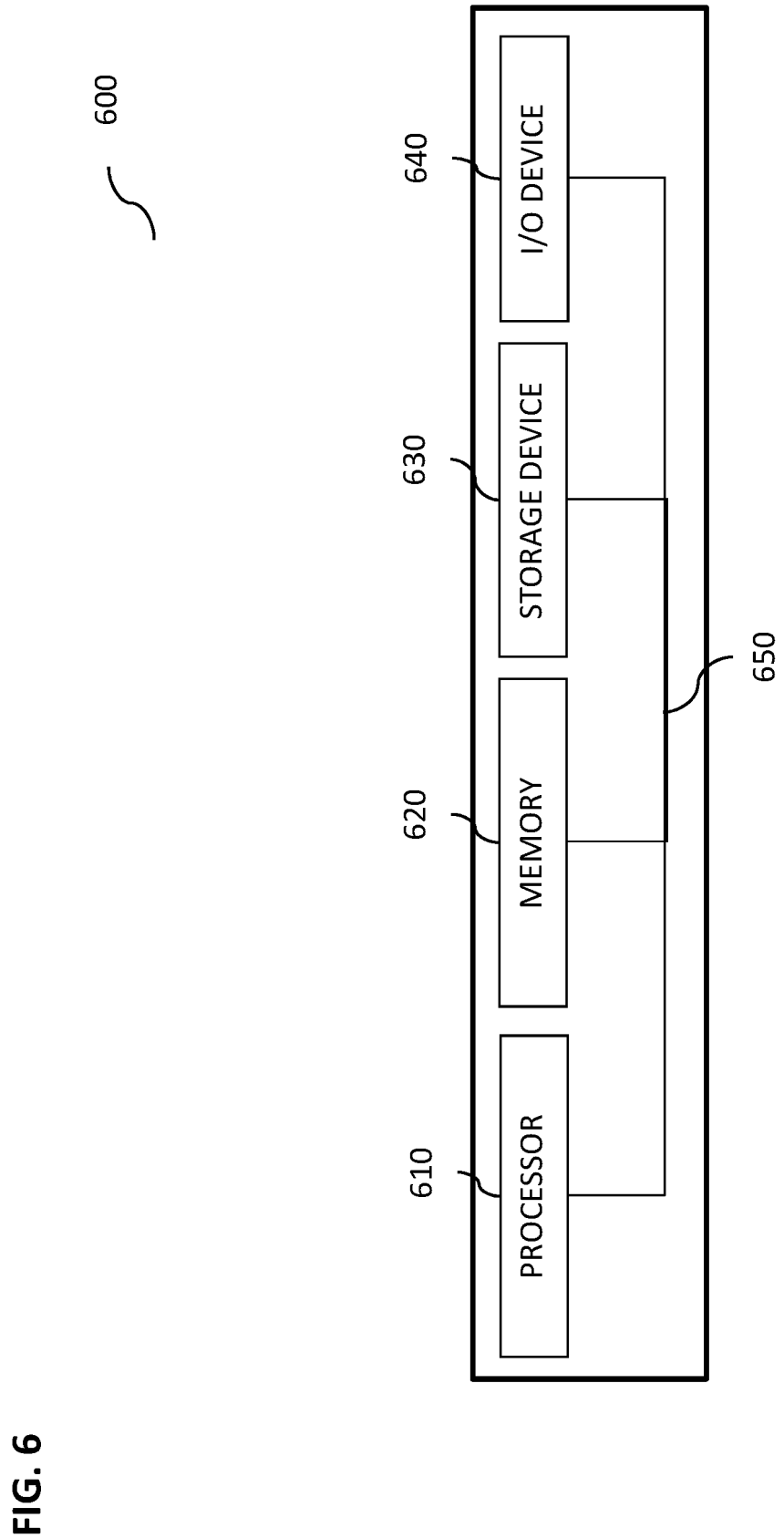
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
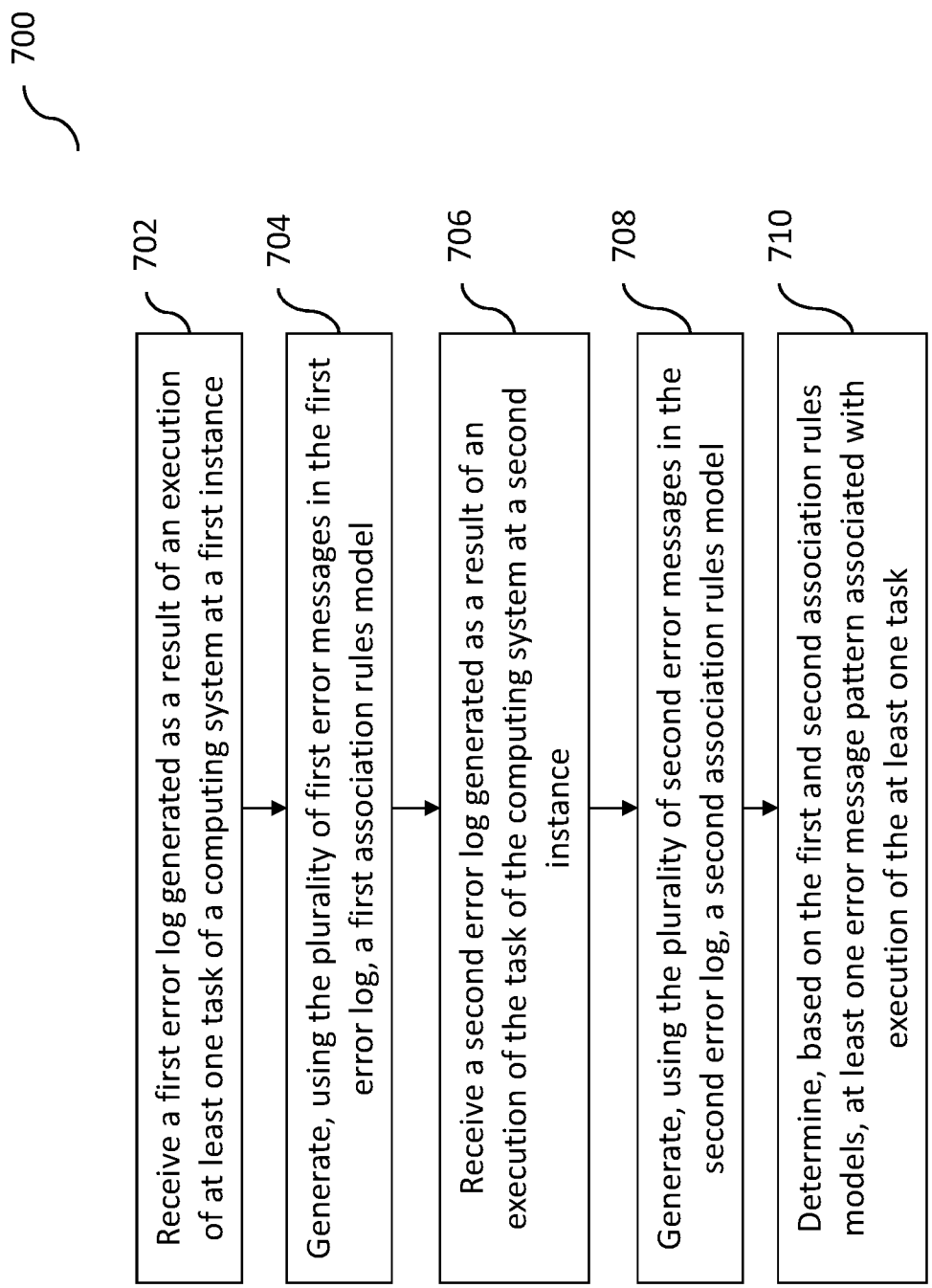
FIG. 7 illustrates an exemplary method, according to some implementations of the current subject matter.

FIG. 7 illustrates an exemplary method 700 for analyzing error messages in computing systems, according to some implementations of the current subject matter. The method 700 may be executed by the system 100 shown in FIG. 1 and/or system 200 shown in FIG. 2. The method 700 may implement graph schemas that are discussed above with regard to FIGS. 3-5f. In particular, the method 700 may be used to generate one or more association rules and a corresponding model based on the received error messages to analyze dynamics of error messages between various instances, where the instances may correspond to different points in time, user sessions, versions of computing components, system, etc., and/or any other instances.

At 702, a first error log generated as a result of an execution of at least one task of a computing system may be received. The error logs may be received/monitored by the log analysis system 204 shown in FIG. 2 In particular, the log monitoring module 210 may be configured to monitor error logs generated by one or more computing components of the cloud system 108. In some exemplary implementations, the error log may include a plurality of error messages (as for example shown in FIG. 3). Each error message in the plurality of error messages may include a first portion (e.g., an identification of the error) and a second portion (e.g., contextual information that may be added to the error message to provide additional information, whereby the contextual information may be extraneous and/or not necessary for the purposes of error identification, analysis, and/or resolution). The first error log may be generated as a result of execution of the task at a first instance. The first instance may correspond and/or include one or more of the following (as discussed above): a time instance, an instance corresponding to a version of a computing component, system, etc., and/or any combination thereof.

At 704, a first association rules model that includes a plurality of association rules may be generated based on the error messages in the log. Each association rule may define one or more relationships (e.g., as shown in FIGS. 4, 5a-f) between at least one of: one or more first error messages in the plurality of error messages, one or more computing components in the plurality of computing components, the computing system, the at least one task, and any combination thereof.

At 706, a second error log generated as a result of an execution of the at least one task of the computing system at a second instance may be received. The second error log may include a plurality of second error messages. The second instance, similar to the first instance, may include one or more of the following: a time instance, an instance corresponding to a version of a computing component, system, etc., and/or any combination thereof. The second error messages may be same and/or different as the first error messages. In some implementations, the both sets of messages may be templatized/in template error format.

At 708, a second association rules model may be generated using the plurality of second error messages. At least one error message pattern (e.g., representative of a dynamic of the computing system) may be determined based on the generated first and second association rules models, at 710. The pattern may be used to analyze error dynamics in the computing system.

In some implementations, the current subject matter can include one or more of the following optional features. In some implementations, as part of the receiving of error logs, each error message in the plurality of first and second error messages may be represented/generated in a template error format having at least one contextual information removed from the error message.

In some implementations, at least one of the first and second association rules models may be generated using one or more historical error messages associated with prior execution of the at least one task.

In some implementations, the method 700 may include generating a graph schema representative of each association rules model, and storing the generated association rules model graph schemas in a graph database. The first and second instances may include at least one of the following: one or more time instances corresponding to the execution of the at least one task, one or more version instances of one or more computing components, and any combination thereof. Each association rule in the plurality of association rules may include a confidence parameter characterizing the one or more relationships.

In some implementations, the method 700 may further include querying the stored graph schemas to determine at least one of the following: one or more added relationships in at least one of the first and second association rules models, one or more existing relationships removed from at least one of the first and second association rules models, one or more removed first error messages, one or more removed second error messages, one or more added first error messages, one or more added second error messages, and any combination thereof.

In some implementations, the method 700 may include applying the error message pattern to resolve one or more errors during execution of the at least one task.

In some implementations, the pluralities of first and second error messages may include at least one of the following: an error message generated as a result of the execution of the at least one task, an error message generated by the at least one computing component in the plurality of computing components, an error message likely to be generated as a result of at least one of the execution of at least one task and the at least one computing component, an error message generated or likely to be generated subsequent to at least another error message in the plurality of error messages, and any combination thereof.

In some implementations, the error message pattern may include a fixed pattern of error messages. Alternatively, the error message pattern may include at least one error message in the plurality of error messages generated by at least two computing components in the plurality of computing components.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a first error log generated as a result of an execution of at least one task of a computing system at a first instance, the first error log comprising a plurality of first error messages, the computing system comprising a plurality of computing components configured to execute the at least one task;
   generating, using the plurality of first error messages in the first error log, a first association rules model, the first association rules model comprising a plurality of association rules, each association rule defining one or more relationships between at least one of: one or more first error messages in the plurality of first error messages, one or more computing components in the plurality of computing components of the computing system, and the at least one task, wherein each association rule in the plurality of association rules comprises a confidence parameter characterizing the one or more relationships;
   receiving a second error log generated as a result of an execution of the at least one task of the computing system at a second instance, the second error log comprising a plurality of second error messages;
   generating, using the plurality of second error messages in the second error log, a second association rules model; and
   determining, based on the first association rules model and second association rules model, at least one error message pattern associated with execution of the at least one task.

2. The method according to claim 1, wherein receiving the first error log and the second error log further comprises generating each error message in the pluralities of first and second error messages in a template error format having at least one contextual information removed from the error message.

3. The method according to claim 1, wherein at least one of the first and second association rules models are generated using one or more historical error messages associated with prior execution of the at least one task.

4. The method according to claim 2, further comprising:
   generating a graph schema representative of each association rules model; and
   storing the association rules model graph schemas in a graph database.

5. The method according to claim 2, wherein the first and second instances comprise at least one of: one or more time instances corresponding to the execution of the at least one task, one or more version instances of one or more computing components, and any combination thereof.

6. The method according to claim 4, further comprising querying the graph schemas to determine at least one of: one or more added relationships in at least one of the first and second association rules models, one or more existing relationships removed from at least one of the first and second association rules models, one or more removed first error messages, one or more removed second error messages, one or more added first error messages, one or more added second error messages, and any combination thereof.

7. The method according to claim 1, further comprising:
   applying the at least one error message pattern to resolve one or more errors during execution of the at least one task.

8. The method according to claim 1, wherein the pluralities of first and second error messages comprise at least one of: an error message generated as a result of the execution of the at least one task, an error message generated by the at least one computing component in the plurality of computing components, an error message likely to be generated as a result of at least one of the execution of at least one task and the at least one computing component, an error message generated or likely to be generated subsequent to at least another error message in the plurality of first and second error messages, and any combination thereof.

9. The method according to claim 1, wherein the at least one error message pattern comprises a fixed pattern of error messages.

10. The method according to claim 1, wherein the at least one error message pattern comprises at least one error message in the plurality of first error messages generated by at least two computing components in the plurality of computing components.

11. A system comprising:
at least one programmable processor; and
a non-transitory machine-readable medium storing instructions that, when executed by the at least one programmable processor, cause the at least one programmable processor to perform operations comprising:
receiving a first error log generated as a result of an execution of at least one task of a computing system at a first instance, the first error log comprising a plurality of first error messages, the computing system comprising a plurality of computing components configured to execute the at least one task;
generating, using the plurality of first error messages in the first error log, a first association rules model, the first association rules model comprising a plurality of association rules, each association rule defining one or more relationships between at least one of: one or more first error messages in the plurality of first error messages, one or more computing components in the plurality of computing components of the computing system, and the at least one task, wherein each association rule in the plurality of association rules comprises a confidence parameter characterizing the one or more relationships;
receiving a second error log generated as a result of an execution of the at least one task of the computing system at a second instance, the second error log comprising a plurality of second error messages;
generating, using the plurality of second error messages in the second error log, a second association rules model; and
determining, based on the first association rules model and second association rules model, at least one error message pattern associated with execution of the at least one task.

12. The system according to claim 11, wherein receiving the first error log and the second error log further comprises generating each error message in the pluralities of first and second error messages in a template error format having at least one contextual information removed from the error message.

13. The system according to claim 11, wherein at least one of the first and second association rules models are generated using one or more historical error messages associated with prior execution of the at least one task.

14. The system according to claim 12, wherein the operations further comprise:
generating a graph schema representative of each association rules model;
storing the association rules model graph schemas in a graph database; and
querying the graph schemas to determine at least one of: one or more added relationships in at least one of the first and second association rules models, one or more existing relationships removed from at least one of the first and second association rules models, one or more removed first error messages, one or more removed second error messages, one or more added first error messages, one or more added second error messages, and any combination thereof.

15. The system according to claim 12, wherein the first and second instances comprise at least one of: one or more time instances corresponding to the execution of the at least one task, one or more version instances of one or more computing components, and any combination thereof.

16. The system according to claim 11, wherein the operations further comprise applying the at least one error message pattern to resolve one or more errors during execution of the at least one task.

17. The system according to claim 11, wherein the pluralities of first and second error messages comprise at least one of: an error message generated as a result of the execution of the at least one task, an error message generated by the at least one computing component in the plurality of computing components, an error message likely to be generated as a result of at least one of the execution of at least one task and the at least one computing component, an error message generated or likely to be generated subsequent to at least another error message in the plurality of first and second error messages, and any combination thereof.

18. A computer program product comprising a non-transitory machine-readable medium storing instructions that, when executed by at least one programmable processor, cause the at least one programmable processor to perform operations comprising:
receiving a first error log generated as a result of an execution of at least one task of a computing system at a first instance, the first error log comprising a plurality of first error messages, the computing system comprising a plurality of computing components configured to execute the at least one task;
generating, using the plurality of first error messages in the first error log, a first association rules model, the first association rules model comprising a plurality of association rules, each association rule defining one or more relationships between at least one of: one or more first error messages in the plurality of first error messages, one or more computing components in the plurality of computing components of the computing system, and the at least one task, wherein each association rule in the plurality of association rules comprises a confidence parameter characterizing the one or more relationships;
receiving a second error log generated as a result of an execution of the at least one task of the computing system at a second instance, the second error log comprising a plurality of second error messages;
generating, using the plurality of second error messages in the second error log, a second association rules model; and
determining, based on the first association rules model and second association rules model, at least one error message pattern associated with execution of the at least one task.

* * * * *